United States Patent [19]

Kelly

[11] 4,097,169

[45] Jun. 27, 1978

[54] CLAMP ARRANGEMENT AND SYSTEM FOR SHEET MATERIAL

[76] Inventor: Clifford G. Kelly, #2-10492 135th St., Surrey, British Columbia, Canada, V3T 4C5

[21] Appl. No.: 730,371

[22] Filed: Oct. 7, 1976

Related U.S. Application Data

[63] Continuation of Ser. No. 620,110, Oct. 6, 1975, abandoned.

[51] Int. Cl.² ............................................. F16B 2/02
[52] U.S. Cl. ............................ 403/391; 24/81 CC; 24/135 R; 24/243 K; 403/396; 135/15 CF
[58] Field of Search ................ 24/81 R, 72.5, 81 CC, 24/81 C, 73 R, 73 C, 73 CC, 73 CF, 81 BA, 81 G, 243 K, 243 R, 135 R, 136 B, 136 R, 248 R, 248 SA, 265 R; 403/389, 391, 396; 135/15 CF

[56] References Cited

U.S. PATENT DOCUMENTS

| | | | |
|---|---|---|---|
| 795,782 | 7/1905 | Porter | 24/81 BA |
| 972,159 | 10/1910 | Campbell | 24/72.5 UX |
| 1,300,482 | 4/1919 | Petranich | 24/73 CH X |
| 2,426,479 | 8/1947 | Wohlhieter | 24/81 CC |
| 2,452,406 | 10/1948 | Volkery et al. | 24/81 CC |
| 3,141,221 | 7/1964 | Faulls, Jr. | 24/243 R X |
| 3,225,408 | 12/1965 | Durham | 135/15 CF |
| 3,268,946 | 8/1966 | Case | 24/81 CC |
| 3,887,291 | 6/1975 | Langren | 403/391 |

*Primary Examiner*—Werner H. Schroeder
*Assistant Examiner*—Moshe I. Cohen
*Attorney, Agent, or Firm*—Fetherstonhaugh & Co.

[57] ABSTRACT

A clamp arrangement particularly for plastic sheets and including a pair of jaw plates having opposed jaws with clamping means for drawing the plates towards each other to cause the jaws to grip a rod around which a portion of a sheet has been wrapped to hold the sheet in the clamp arrangement. The space between the jaws has substantially the same cross sectional shape as the rod, and the jaw plates include means for receiving rope-like securing means for anchoring the plates and the gripped sheet to a base.

11 Claims, 6 Drawing Figures

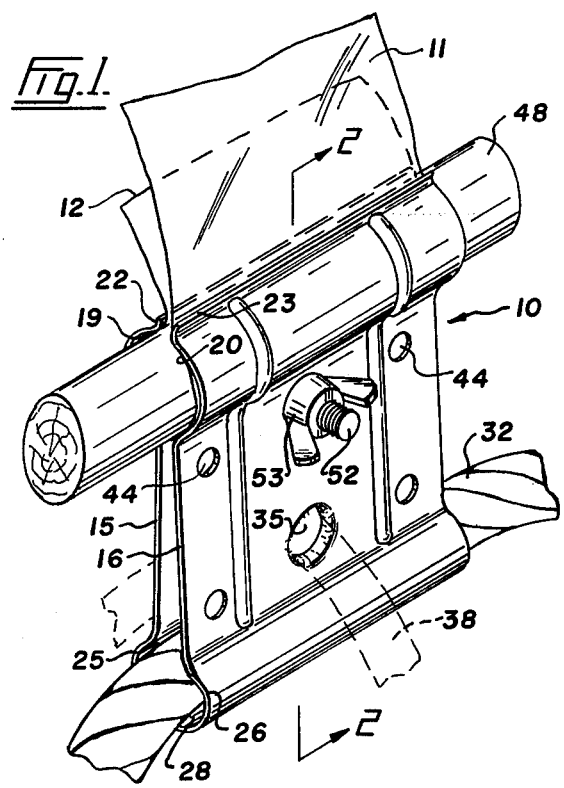
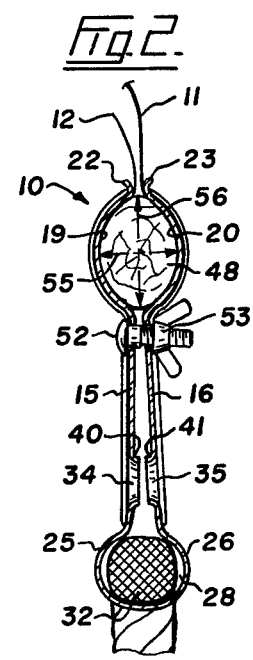

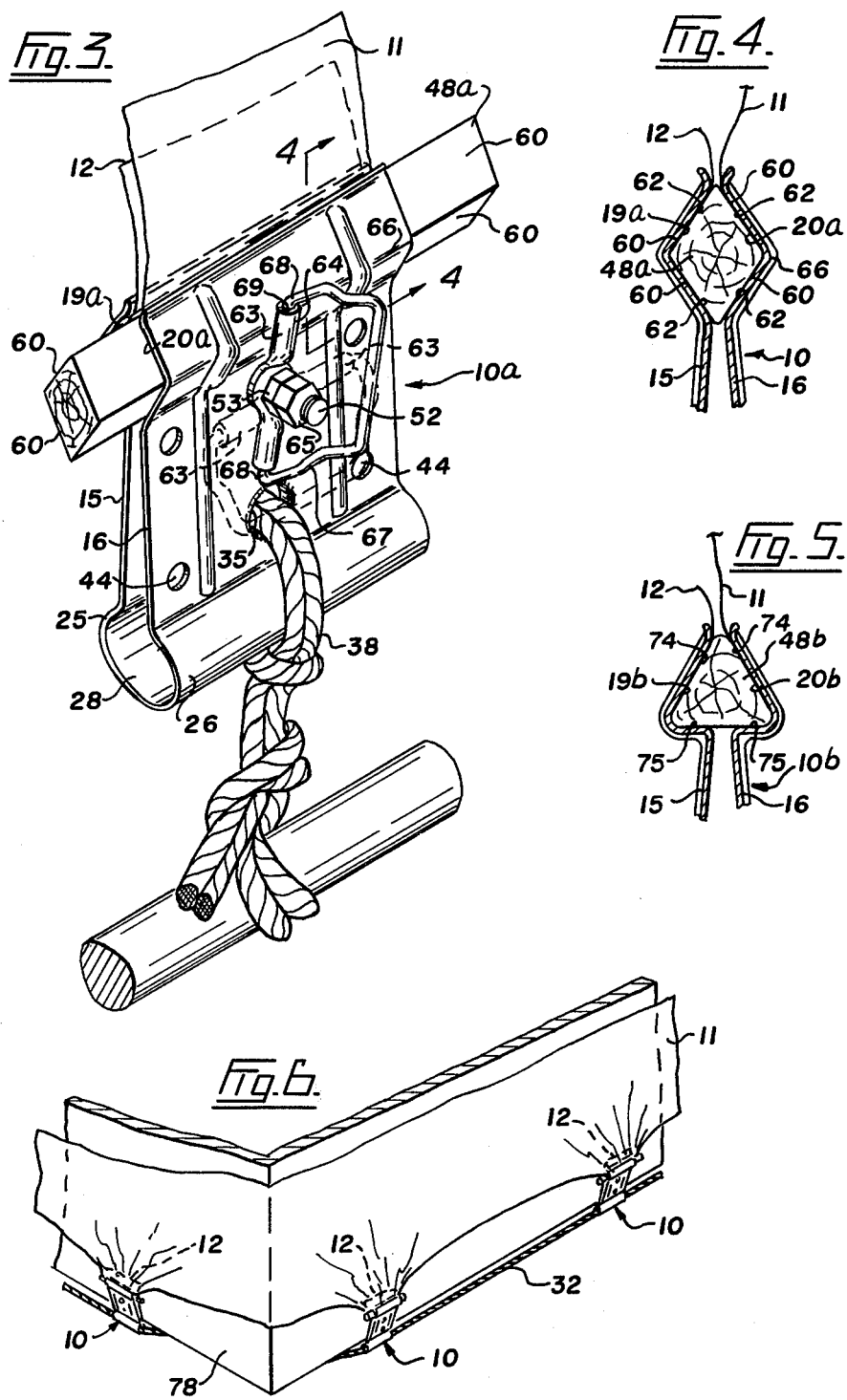

CLAMP ARRANGEMENT AND SYSTEM FOR SHEET MATERIAL

This is a continuation of application Ser. No. 620,110 filed Oct. 6, 1975, now abandoned.

This invention relates to a clamp arrangement for securing sheet material to a base, such as a cover over a vehicle, boat or the like.

Although this clamp arrangement can be used with any type of sheet material, such as a canvas tarpaulin, it is particularly designed for plastic sheet material, such as polyethylene, which because of its very smooth and somewhat slippery surfaces, is extremely difficult to clamp or grip firmly.

Plastic sheets are more and more displacing the traditional canvas tarpaulins because they are readily available in many different types of stores, light in weight, can be folded into small bundles, are relatively inexpensive, are completely waterproof, and do not need to be subjected to periodic treatment to maintain their waterproof qualities. Although grommets can be used in these sheets for securing ropes, as in ordinary tarpaulins, this is not very successful since the plastic material is not strong enough to stand relatively great strain in grommets near the sheet edges. In addition, the use of grommets would mean the necessity of manufacturing plastic sheets for specific purposes.

As plastic sheets are available everywhere and as they are relatively inexpensive, people are using them for many different covering purposes, such as covers for automobiles, trailers, boats, bins and the like. However, there is one problem always present, that is the difficulty in tying or securing the sheets to the base or article being covered. These plastic sheets are so smooth that they easily slip out from under tying ropes, and particularly if they are exposed to winds. None of the known clamping devices will grip and hold this slippery material.

There is a great need for a clamp that can grip a plastic sheet without causing it to rip, tear or weaken the sheet, and which can be used, for example, to secure the sheet to a base by means of ropes, cables, wires, nails, screws or the like. The clamp arrangement of the present invention meets this need. In addition, this clamp arrangement can be quickly and easily applied and removed without damaging the sheet in any way.

The term "base" is used throughout this specification and the accompanying claims to mean any article to be covered, such as a vehicle, boat, bin or the like, and the terms "rope" and "rope means" are used for ropes, cables, wires or any other flexible connecting means for securing tarpaulins and the like to "bases".

A clamp arrangement in accordance with the present invention for securing sheet material to a base comprises a clamp having a pair of jaw plates with opposed grooves thereon to act as jaws for receiving a rod with a sheet extending therearound and placed between the jaw plates, and clamping means for drawing the plates together to cause said jaws to grip the rod and thereby secure the sheet to said rod. These grooves are preferably of a predetermined cross section to enclose a space therebetween shaped to receive a rod of substantially the same cross section.

A clamp system according to this invention for securing a sheet to a base comprises wrapping a portion of a sheet around a rod, gripping the wrapped sheet and rod by jaws of a clamp, and securing said clamp to the base by ropes or other means.

Examples of clamp arrangements according to this invention are illustrated in the accompanying drawings in which:

FIG. 1 is a perspective view of one form of clamp arrangement,

FIG. 2 is a vertical section taken on the line 2—2 of FIG. 1,

FIG. 3 is a perspective view of a preferred form of clamp arrangement, and illustrating a quick clamp device usable with any one of the clamp arrangements described herein, FIG. 4 is a fragmentary vertical section on line 4—4 of FIG. 3, FIG. 5 is a fragmentary vertical section similar to FIG. 4 through another alternative form of clamp arrangement, and FIG. 6 diagrammatically illustrates by way of example one use for these clamp arrangements.

Referring to the drawings, 10 is a clamp according to this invention for gripping a sheet 11 usually near an edge 12 thereof. This sheet may be formed of any suitable material, but the clamp is primarily designed for plastic sheets, such as polyethylene, having very smooth surfaces.

Clamp 10 is made of a pair of jaw plates 15 and 16 having opposed grooves 19 and 20 formed therein adjacent and substantially parallel to edges or end 22 and 23 of these plates. These grooves act as gripping jaws in the plates. By referring to FIG. 2, it will be seen that edges 22 and 23 are flared outwardly or away from each other.

Plates 15 and 16 extend substantially parallel to each other to opposite edges or ends 25 and 26 that are preferably integrally connected together as shown in FIGS. 1 and 2. However, it is to be understood that the jaw plates may be made separately, in which case they would be interconnected at ends 25 and 26 in any suitable manner. In this example, connected ends 25 and 26 are shaped to form a channel 28 between plates 15 and 16 and extending substantially parallel to jaw grooves 19 and 20. The shaping of the plates at ends 25 and 26 is preferably such that the plates with their respective grooves 19 and 20 are biased away from each other. By referring to FIG. 2, it will be seen that plate ends 25 and 26 are curved in cross section and act as spring means to bias the opposite plate ends 22 and 23 outwardly away from each other. Channel 28 is adapted to receive rope means, such as an anchoring or securing rope 32.

Alternatively or in addition to channel 28, plates 15 and 16 are formed with aligned holes 34 and 35 therethrough for receiving rope means, such as an anchoring or securing rope 38, shown in broken lines in FIG. 1. Holes 34 and 35 are preferably formed by punching plates 15 and 16 inwardly so as to form inwardly extending flanges 40 and 41, see FIG. 2, to prevent any chafing of rope 38 (omitted from this Figure).

In addition to or instead of channel 28 and/or holes 34 and 35, plates 15 and 16 may be provided with a plurality of aligned holes 44 for suitable fastening means, such as nails, screws or the like.

Clamp 10 is adapted to be used along with a rod 48 around which a portion of sheet 11 is wound, preferably near the edge 12 thereof, as shown in FIG. 1. The grooves 19 and 20 are of a predetermined cross section so as to enclose a space therebetween shaped to receive rod 48.

Suitable clamping means is provided for drawing plates 15 and 16 together to cause the jaws formed by grooves 19 and 20 to grip rod 48 and to secure the sheet to the rod. In this example, a nut and bolt arrangement is provided for this purpose. A bolt 52 extends through holes in the plates near the jaws thereof, and a nut 53 is threaded on the bolt. Nut 53 is preferably a wing nut.

Rod 48 can be circular in cross section and grooves 19 and 20 correspondingly shaped, but it is difficult for the clamp to prevent the sheets from being drawn out if the sheet is subjected to a very strong pull. The reason for this is that the rod may roll and/or the sheet may slide around the rod, particularly if the clamp is not very tightly closed by nut 53. However, this possibility is reduced if the rod is relatively soft so that it will deform a little when gripped by the clamps. For example, plastic tubing or rope of a suitable diameter can be used as the rod.

It is preferable to use a rod 48 having a cross section shape which is other than round. For example, it desirable to make the distance between the bottoms of grooves 19 and 20, indicated at 55 in FIG. 2, shorter than the distance between the ends of these grooves, indicated at 56. With rod 48 shaped in the same manner, such as oval in cross section, the rod cannot rotate between the grooves because its major cross sectional axis 56 is longer than its minor cross sectional axis 55.

A preferred form of clamp arrangement 10a is illustrated in FIGS. 3 and 4. In this alternative, a rod 48a of rectangular cross section is used, and has four flat sides 60. In this case, each of the grooves 19a and 20a is formed with two angularly arranged flat surfaces 62 so that the grooves enclose a substantially rectangular space into which the rod snugly fits. With this arrangement, the rod cannot rotate within the jaw grooves, and as sheet 11 is wrapped around three corners of the rod, the sheet cannot be drawn out of the clamp when the latter is tightened.

FIG. 3 also includes a quick clamp device which may be used with any one of these clamp arrangements. A locking bar 63 has a central hole through which bolt 52 extends and ends 64 projecting outwardly beyond nut 53 threaded on the bolt. Nut 53 is fixed in any desired manner on bolt 52 with the clamp device in its relaxed or open condition. For example, a lock nut 65 may be provided on the bolt for this purpose. Nut 53 acts as restraining means for bar 63, but it permits rotation of the bar on the bolt while preventing movement of said nut outwardly along the bolt. At this time bar 63 lies across plate 16, as shown in dotted lines in FIG. 3, and between nut 53 and the plate. The locking bar is loose and the clamp is open at this time. After rod 48a with sheet 11 wound around it is placed between the gripping jaws 19a and 20a, bar 63 is turned through 90 degrees into a locking position, at which time one end 64 rides up on a protuberance 66 formed on plate 16. In this example, the protuberance is formed by the portion of plate 16 which has been pressed outwardly to form groove 20a. As the locking bar cannot move outwardly as it is rotated into this position because of nut 53, the jaws are pressed towards each other to grip the the sheet and rod. If a very tight grip is required, a bail 67 may be provided for bar 63. This bail has inturned ends 68 which fit into sockets 69 formed in and opening out from the bar ends 64. Bail 67 provides a handle for the locking bar to make it possible to rotate the bar even when protuberance 66 is relatively high so that considerable pressure is exerted against rod 48a.

FIG. 5 illustrates another alternative clamp arrangement 10b. Rod 48b is substantially triangular in cross section, and the grooves 19b and 20b are formed with long flat surfaces 74 and short flat surfaces 75 to match the adjacent portions of the sides of the rod. Rod 48b cannot rotate between the jaw grooves, and as sheet 11 makes relatively sharp angular turns at the corners of the rod, said sheet cannot be pulled out of the clamp.

In use, a plurality of clamps according to this invention are secured to edges of a cover sheet 11, each in the manner described above, see FIG. 6. When a rope 32 is drawn through the channels 28 of the clamps, it acts as a draw string, and after it has been pulled to tighten the sheet over the base 78 being covered, the rope can be tied to retain the sheet in place. Sections of the rope extend beneath portions of the base 78, or the rope can be secured thereto in any other desired manner.

Instead of or in addition to rope 32, one end of a rope 38 may be tied to each clamp, and its opposite end secured to the base 78 or to another clamp secured to the cover sheet after passing through or under part of the base.

If desired, both of the ropes may be omitted, in which case nails or screws may be driven through holes 44 to secure the clamp and the sheet to the base.

When either rope 32 or rope 38 is used, the sheet can be released from any clamp merely by loosening nut 53 and withdrawing rod 48 from the clamping jaws. If nails or screws are used in holes 44, they would have to be loosened or removed before the sheet can be released.

I claim:

1. A clamp arrangement for securing sheet material to a base, comprising a clamp having a pair of jaw plates with opposed grooves therein to act as jaws for receiving a rod with a sheet extending therearound and placed between the jaw plates, and clamping means for drawing the plates together to cause said jaws to grip the rod and thereby secure the sheet to said rod, said grooves being of a predetermined cross section to enclose a space therebetween shaped to receive a rod of substantially the same cross section, and said clamping means comprising a bolt secured to one of said plates and extending through a hole in the other of said plates, a locking bar mounted for rotation on the bolt adjacent said other plate, restraining means on the bolt to prevent movement of said bar outwardly along the bolt, and a protuberance on said adjacent plate near the bolt, said bar being rotatable on the bolt from a position clear of the protuberance, at which time the jaws are open, to a locking position on the protuberance to move the jaws towards each other to grip a rod and sheet therebetween.

2. A clamp arrangement as claimed in claim 1 in which said grooves are of a cross section other than round to receive a rod of a corresponding other than round cross section.

3. A clamp arrangement as claimed in claim 1 in which said grooves are of angular cross section to receive a rod of substantially rectangular cross section.

4. A clamp arrangement as claimed in claim 1 in which said grooves are of substantially triangular cross section to receive a rod of substantially triangular cross section.

5. A clamp arrangement as claimed in claim 1 including a bail connected to ends of the locking bar to act as a handle by means of which said bar can be rotated into and out of said locking position.

6. A clamp arrangement as claimed in claim 1 in which said grooves are adjacent and substantially parallel with adjacent ends of the plates, and said plates are secured together at opposite ends thereof.

7. A clamp arrangement as claimed in claim 1 including means on the jaw plates for receiving rope means for anchoring said plates and the sheet secured thereto to a base.

8. A clamp arrangement as claimed in claim 1 in which said jaw plates are relatively flat and are bent outwardly from outer faces thereof to form said grooves opening inwardly from inner faces thereof, the bent-out portion of said adjacent plate forming said protuberance on the latter plate.

9. A clamp arrangement as claimed in claim 1 in which said receiving means comprises a channel formed by the plates extending substantially parallel to said jaw grooves and through which the rope means can extend.

10. A clamp arrangement as claimed in claim 9 in which said receiving means comprises holes in the plates through which the rope means can extend.

11. A clamp arrangement as claimed in claim 1 including holes extending through said plates through which fastening means can extend to anchor the plates and the sheet secured thereto to a base.

* * * * *